UNITED STATES PATENT OFFICE.

JACOB I. DANFORTH, OF NEWBURYPORT, MASSACHUSETTS.

IMPROVEMENT IN STOVE-POLISHES.

Specification forming part of Letters Patent No. 139,047, dated May 20, 1873; application filed April 9, 1873.

*To all whom it may concern:*

Be it known that I, JACOB I. DANFORTH, of Newburyport, in the county of Essex and State of Massachusetts, have invented an Enamel for Polishing Stoves, &c., and I hereby declare that the following is a full, clear, and exact description of the same.

My invention consists in a composition of copperas, bone-black, and black-lead, which, when required for use, needs only to be mixed with water to the consistency of cream, in which condition it may be readily applied to a stove, when cold, by means of a brush, and, after being allowed to dry thereon, will, when rubbed, produce a brilliant and permanent gloss, free from odor.

To enable others skilled in the art to understand and use my invention, I will proceed to describe the manner in which I have carried it out.

I take two (2) parts of powdered copperas, one (1) part of pulverized bone-black, and one part of powdered black-lead, by weight, (English black-lead preferred,) and thoroughly mix or incorporate them together with a spatula, or in any other convenient manner.

The powder thus formed is put up into tin boxes, or other packages, for sale, and when required for use a portion of it is mixed with sufficient water to bring it to about the consistency of cream, being stirred frequently during about five minutes.

It may now be applied by a brush to a stove, when cold, and allowed to remain thereon ten (10) or fifteen (15) minutes, till the water contained in the mixture has evaporated therefrom, when it may be rubbed over and polished with a dry brush, or dry end of the same brush, producing a brilliant gloss upon the stove.

After one or two applications of my enamel to the stove it will not again require to be polished for a considerable length of time, the copperas producing a jet-black enamel, and causing the lead to permanently adhere to the stove.

Owing to the durability of my improved enamel, the labor and expense of keeping the stove bright is materially reduced, whereas stove-polishes now in use require to be repeatedly applied, and the ultimate expense of the same is consequently greater.

Should a surface polished with my enamel be covered with dirt or ashes, they may be brushed off without in the least destroying its luster, which cannot be done were the surface polished with any of the stove-polishes heretofore used.

My enamel is free from odor, whether the stove be hot or cold, and requires less labor to apply, and a higher degree of luster is obtained than where other stove-polish is employed.

*Claim.*

What I claim as my invention, and desire to secure by Letters Patent, is—

The herein-described enamel for polishing stoves, &c., compounded of the ingredients specified, substantially as set forth.

Witness my hand this 4th day of April, A. D. 1873.

JACOB I. DANFORTH.

Witnesses:
    A. J. ATKINSON,
    F. F. FEARING.